(12) United States Patent
Clegg et al.

(10) Patent No.: US 6,930,260 B2
(45) Date of Patent: *Aug. 16, 2005

(54) SWITCH MATRIX

(75) Inventors: Paul T. Clegg, Lindon, UT (US); Wallace E. Day, Payson, UT (US)

(73) Assignee: VIP Investments Ltd., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/726,862

(22) Filed: Dec. 2, 2003

(65) Prior Publication Data

US 2004/0074742 A1 Apr. 22, 2004

Related U.S. Application Data

(63) Continuation of application No. 10/024,129, filed on Dec. 17, 2001, now Pat. No. 6,660,948.
(60) Provisional application No. 60/272,020, filed on Feb. 28, 2001.

(51) Int. Cl.$^7$ ............................................. H01H 13/70
(52) U.S. Cl. ........................................................ 200/5 A
(58) Field of Search ........................ 200/5 A, 341–345; 400/490, 495, 496

(56) References Cited

U.S. PATENT DOCUMENTS

| | | | |
|---|---|---|---|
| 2,828,413 A | 3/1958 | Bowers | |
| 2,853,585 A | 9/1958 | Danziger et al. | |
| 3,284,667 A | 11/1966 | Harris et al. | |
| 3,491,249 A | 1/1970 | Rabinow | |

(Continued)

FOREIGN PATENT DOCUMENTS

| | | |
|---|---|---|
| DE | 32 24 997 A1 | 1/1984 |
| DE | 43 08 161 A1 | 9/1994 |
| EP | 0 022 516 | 1/1981 |
| EP | 0 040 339 | 11/1981 |

(Continued)

OTHER PUBLICATIONS

Ademco, "No. 5827BD Wireless Bidirectional Console used with No. 5800$^{TH}$ Transmitter Module Installation Instructions and Operating Guide," Aug. 1993.

Ademco, "No. 5827BD Wireless Bidirectional Console Installation and Setup Guide," Feb. 2004.

(Continued)

Primary Examiner—Michael A. Friedhofer

(74) Attorney, Agent, or Firm—Clayton, Howarth & Cannon, P.C.

(57) ABSTRACT

A switch matrix is disclosed for keypads used in devices such as primary control points for automation systems in homes vehicles, or businesses. The switch matrix preferably includes a support frame for supporting a grid of key positioning members arranged in a series of rows and columns. The key positioning members each preferably include cantilevers which can be deflected by pressing the keys to activate switches associated with the keypad. The cantilevers preferably have knobs which are received in corresponding openings in the keys so that the keys can be removably attached to the cantilevers with a compression fit. This allows keys of different sizes and shapes to be easily attached to the keypad in various configurations without the need for different attaching devices for each situation.

53 Claims, 6 Drawing Sheets

U.S. PATENT DOCUMENTS

| | | |
|---|---|---|
| 3,697,821 A | 10/1972 | Johnson |
| 3,736,591 A | 5/1973 | Rennels et al. |
| 3,885,116 A | 5/1975 | Kodaira |
| 3,918,062 A | 11/1975 | Haruki et al. |
| 3,940,660 A | 2/1976 | Edwards |
| 3,980,954 A | 9/1976 | Whyte |
| 4,016,561 A | 4/1977 | Parker et al. |
| 4,095,139 A | 6/1978 | Symonds et al. |
| 4,123,756 A | 10/1978 | Nagata et al. |
| 4,163,218 A | 7/1979 | Wu |
| 4,194,099 A | 3/1980 | Mickelson |
| 4,203,096 A | 5/1980 | Farley et al. |
| 4,206,443 A | 6/1980 | Britton |
| 4,225,808 A | 9/1980 | Saraceni |
| 4,262,180 A | 4/1981 | Walter |
| 4,274,045 A | 6/1981 | Goldstein |
| 4,300,090 A | 11/1981 | Weber |
| 4,303,811 A | 12/1981 | Parkinson |
| 4,334,171 A | 6/1982 | Parman et al. |
| 4,336,464 A | 6/1982 | Weber |
| 4,338,595 A | 7/1982 | Newman |
| 4,381,456 A | 4/1983 | Saito et al. |
| 4,388,567 A | 6/1983 | Yamazaki et al. |
| 4,395,660 A | 7/1983 | Waszkiewicz |
| 4,418,333 A | 11/1983 | Schwarzbach et al. |
| 4,421,966 A | 12/1983 | Pounds |
| 4,463,287 A | 7/1984 | Pitel |
| 4,468,542 A * | 8/1984 | Pounds .................. 200/5 A |
| 4,471,493 A | 9/1984 | Schober |
| 4,484,190 A | 11/1984 | Bedard |
| 4,485,374 A | 11/1984 | Meserow et al. |
| 4,491,843 A | 1/1985 | Boubouleix |
| 4,504,778 A | 3/1985 | Evans |
| 4,521,843 A | 6/1985 | Pezzolo et al. |
| 4,524,288 A | 6/1985 | Schimmelpennink et al. |
| 4,532,395 A | 7/1985 | Zukowski |
| 4,560,909 A | 12/1985 | Peil |
| 4,563,592 A | 1/1986 | Yuhasz et al. |
| 4,575,660 A | 3/1986 | Zaharchuk et al. |
| 4,582,967 A | 4/1986 | Brumit et al. |
| 4,590,614 A | 5/1986 | Erat |
| 4,611,198 A | 9/1986 | Levinson et al. |
| 4,631,377 A | 12/1986 | Imazeki et al. |
| 4,635,040 A | 1/1987 | Masot |
| 4,644,320 A | 2/1987 | Carr et al. |
| 4,684,822 A | 8/1987 | Angott |
| 4,689,547 A | 8/1987 | Rowen et al. |
| 4,691,341 A | 9/1987 | Knoble et al. |
| 4,703,306 A | 10/1987 | Barritt |
| 4,714,983 A | 12/1987 | Lang |
| 4,716,409 A | 12/1987 | Hart et al. |
| 4,719,446 A | 1/1988 | Hart |
| 4,727,296 A | 2/1988 | Zaharchuk et al. |
| 4,728,949 A | 3/1988 | Platte et al. |
| 4,737,769 A | 4/1988 | Masot |
| 4,745,351 A | 5/1988 | Rowen et al. |
| 4,749,917 A | 6/1988 | Angott et al. |
| 4,755,792 A | 7/1988 | Pezzolo et al. |
| 4,764,981 A | 8/1988 | Miyahara et al. |
| 4,772,824 A | 9/1988 | Gulledge |
| 4,783,581 A | 11/1988 | Flowers et al. |
| 4,814,776 A | 3/1989 | Caci et al. |
| 4,823,069 A | 4/1989 | Callahan et al. |
| 4,825,209 A | 4/1989 | Sasaki et al. |
| 4,843,386 A | 6/1989 | Wolf |
| 4,864,588 A | 9/1989 | Simpson et al. |
| 4,876,552 A | 10/1989 | Zakman |
| 4,878,010 A | 10/1989 | Weber |
| 4,889,999 A | 12/1989 | Rowen |
| 4,918,432 A | 4/1990 | Pauley et al. |
| 4,918,717 A | 4/1990 | Bissonnette et al. |
| 4,924,109 A | 5/1990 | Weber |
| 4,940,903 A | 7/1990 | Brown, Jr. et al. |
| 4,948,987 A | 8/1990 | Weber |
| 4,955,084 A | 9/1990 | Umetsu et al. |
| 4,980,806 A | 12/1990 | Taylor et al. |
| 5,003,318 A | 3/1991 | Berneking et al. |
| 5,017,837 A | 5/1991 | Hanna et al. |
| 5,028,853 A | 7/1991 | Brown, Jr. et al. |
| 5,034,602 A | 7/1991 | Garcia, Jr. et al. |
| 5,041,825 A | 8/1991 | Hart et al. |
| 5,051,720 A | 9/1991 | Kittirutsunetorn |
| 5,079,559 A | 1/1992 | Umetsu et al. |
| 5,086,385 A | 2/1992 | Launey et al. |
| 5,109,222 A | 4/1992 | Welty |
| 5,113,498 A | 5/1992 | Evan et al. |
| 5,146,153 A | 9/1992 | Luchaco et al. |
| 5,175,477 A | 12/1992 | Grissom |
| 5,189,412 A | 2/1993 | Mehta et al. |
| 5,209,560 A | 5/1993 | Taylor et al. |
| 5,225,765 A | 7/1993 | Callahan et al. |
| 5,237,264 A | 8/1993 | Moseley et al. |
| 5,239,205 A | 8/1993 | Hoffman et al. |
| 5,247,293 A | 9/1993 | Nakagawa |
| 5,248,919 A | 9/1993 | Hanna et al. |
| 5,280,296 A | 1/1994 | Tan et al. |
| 5,311,656 A | 5/1994 | Eldershaw |
| 5,321,736 A | 6/1994 | Beasley |
| 5,327,426 A | 7/1994 | Dolin, Jr. et al. |
| 5,340,954 A | 8/1994 | Hoffman et al. |
| 5,349,362 A | 9/1994 | Forbes et al. |
| 5,361,985 A | 11/1994 | Rein et al. |
| 5,373,411 A | 12/1994 | Grass et al. |
| 5,382,947 A | 1/1995 | Thaler et al. |
| 5,399,940 A | 3/1995 | Hanna et al. |
| 5,400,246 A | 3/1995 | Wilson et al. |
| 5,401,927 A | 3/1995 | Lundell et al. |
| 5,436,510 A | 7/1995 | Gilbert |
| 5,452,291 A | 9/1995 | Eisenhandler et al. |
| 5,455,464 A | 10/1995 | Gosling |
| 5,455,761 A | 10/1995 | Kushiro et al. |
| 5,467,264 A | 11/1995 | Rauch et al. |
| 5,481,750 A | 1/1996 | Parise et al. |
| 5,490,144 A | 2/1996 | Tran et al. |
| 5,495,406 A | 2/1996 | Kushiro et al. |
| 5,565,855 A | 10/1996 | Knibbe |
| 5,565,865 A | 10/1996 | So |
| 5,588,760 A | 12/1996 | So |
| 5,637,930 A | 6/1997 | Rowen et al. |
| 5,640,141 A | 6/1997 | Myllymaki |
| 5,657,005 A | 8/1997 | Seebeck et al. |
| 5,668,358 A | 9/1997 | Wolf et al. |
| 5,711,588 A | 1/1998 | Rudisill |
| 5,726,644 A | 3/1998 | Jednacz et al. |
| 5,736,965 A | 4/1998 | Mosebrook et al. |
| 5,748,828 A | 5/1998 | Steiner et al. |
| 5,796,382 A | 8/1998 | Beeteson |
| 5,801,345 A | 9/1998 | Mikula-Curtis et al. |
| 5,905,442 A | 5/1999 | Mosebrook et al. |
| 5,912,443 A | 6/1999 | Hasunuma |
| 5,960,942 A | 10/1999 | Thornton |
| 5,962,109 A | 10/1999 | Schwietz |
| 5,975,711 A | 11/1999 | Parker et al. |
| 5,977,901 A | 11/1999 | Fenner |
| 5,982,103 A | 11/1999 | Mosebrook et al. |
| 6,032,202 A | 2/2000 | Lea et al. |
| 6,080,940 A | 6/2000 | Rice |
| 6,140,987 A | 10/2000 | Stein et al. |
| 6,169,256 B1 | 1/2001 | Hanahara et al. |
| 6,180,895 B1 | 1/2001 | Hutchinson et al. |
| 6,184,481 B1 * | 2/2001 | Chen .................. 200/5 A |

| | | | |
|---|---|---|---|
| 6,199,136 | B1 | 3/2001 | Shteyn |
| 6,233,132 | B1 | 5/2001 | Jenski |
| 6,355,890 | B1 | 3/2002 | Kuroda |
| 6,369,800 | B1 | 4/2002 | Nading et al. |
| 6,467,924 | B2 | 10/2002 | Shipman |
| 6,493,874 | B2 | 12/2002 | Humpleman |
| 6,523,696 | B1 | 2/2003 | Saito et al. |
| 6,549,190 | B1 | 4/2003 | Windrem |
| 6,555,774 | B1 * | 4/2003 | Nielsen ............... 200/343 |
| 6,575,607 | B1 | 6/2003 | Klemish et al. |
| 6,593,530 | B2 | 7/2003 | Hunt |
| 6,608,271 | B2 | 8/2003 | Duarte |
| 6,618,764 | B1 | 9/2003 | Shteyn |
| 6,640,141 | B2 | 10/2003 | Bennett |
| 6,660,948 | B2 * | 12/2003 | Clegg et al. ............. 200/5 A |
| 6,680,730 | B1 | 1/2004 | Shields et al. |
| 2001/0055003 | A1 | 12/2001 | Chi et al. |
| 2002/0026533 | A1 | 2/2002 | Dutta et al. |
| 2002/0037004 | A1 | 3/2002 | Bossemeyer et al. |
| 2003/0012035 | A1 | 1/2003 | Bernard |
| 2003/0052770 | A1 | 3/2003 | Mansfield, Jr. et al. |
| 2003/0056012 | A1 | 3/2003 | Modeste et al. |
| 2003/0129969 | A1 | 7/2003 | Rucinski |
| 2003/0227894 | A1 | 12/2003 | Wang et al. |
| 2003/0233429 | A1 | 12/2003 | Matte et al. |
| 2004/0037288 | A1 | 2/2004 | Bourgart et al. |
| 2004/0054747 | A1 | 3/2004 | Breh et al. |

FOREIGN PATENT DOCUMENTS

| | | |
|---|---|---|
| EP | 0 054 582 | 6/1982 |
| EP | 0 196 347 | 10/1986 |
| EP | 0 293 569 | 12/1988 |
| EP | 0 327 128 | 8/1989 |
| EP | 0 346 614 | 12/1989 |
| EP | 0 357 136 | 3/1990 |
| EP | 0 361 734 | 4/1990 |
| EP | 0 435 224 | 7/1991 |
| EP | 0 466 152 | 1/1992 |
| EP | 0 513 443 | 11/1992 |
| EP | 0 552 769 | 7/1993 |
| EP | 0 555 869 | 8/1993 |
| EP | 0 558 349 | 9/1993 |
| EP | 0 616 451 | 9/1994 |
| EP | 0 626 635 | 11/1994 |
| EP | 0 687 078 | 12/1995 |
| FR | 2 702 115 | 9/1994 |
| GB | 1 215 009 | 12/1970 |
| GB | 2 099 222 | 12/1982 |
| GB | 2 166 328 | 4/1986 |
| WO | WO 86/06890 | 11/1986 |
| WO | WO 90/08418 | 7/1990 |
| WO | WO 93/13507 | 7/1993 |
| WO | WO 95/32595 | 11/1995 |
| WO | WO 97/29560 | 8/1997 |

OTHER PUBLICATIONS

"The search for standard automation protocols narrows," Air Conditioning Heating & Refrigeration News, vol. 191, No. 5, p. 9, Jan. 1994.

Anonymous, "Echelon releases LONWORKS control network protocol, opening up huge potential," Sensor Review, vol. 16, No. 4, p. 9, 1996.

Anonymous, "Ne w products offer high–speed transmission in control networks," Sensor Review, vol. 13, No. 4, p. 39, 1993.

"1 Million Nodes," Appliance Manufacturer, vol. 44, No. 1, p. 16, Jan. 1996.

Ballerini et al., "AISI Research and MPR Ltd. to Develop and Market Home Automation Products for Telecommunications Industry," Business Wire, Sec. 1, p. 1, Jun. 2, 1989.

Berger, "Plug–In Remote Controls For The Whole House," Home Mechanix, vol. 88, No. 762, pp. 26–29, 76, Feb. 1992.

Bertsch, "Development Tools for Home Automation," IEEE Transactions on Consumer Electronics, vol. 36, No. 4, pp. 854–858, Nov. 1990.

Beuth Vertag GMBH, "DIN 19 245 Teil 1: Profibus," DIN Deutsches Institute fur Normung E.V., Apr. 1991.

Boughton, "Hard–Wired Home: Automated systems can control everything from lights to curling irons to hot tubs— all at the push of a button," The San Francisco Chronicle, p. Z1, Aug. 30, 1995.

Buffkin, "CEBus, LonWorks heading from 'HomeLAN,'" Electronic Engineering Times, vol. 847, p. 38, May 8, 1995.

Bushby, "the BACnet communication protocol for building automation system," Ashrae Journal, pp. 14–21, Apr. 1991.

"Getting all your appliances on the same wavelength," Business Week, vol. 3088, p. 92E, Jan. 23, 1989.

Butler, "Personal Technology at Home with Technology: LonWorks may run home of the future," The Atlanta Journal the Atlanta Constitution, p. P6, Nov. 19, 1995.

Bulter, "Wireless Light Switch Flexible, Easy to Install," The Colombus Dispatch, p. 10H, Oct. 23, 1993.

Butler, "Add–On Light Switch Eliminate Wiring Hassles," Roanoke Times & World News, p. 3, Jun. 6, 1995.

Bybee, "Build Reacts: The Radio–Electronics Advanced Control System," Radio Electronics, vol. 59, No. 10, p. 65, Oct. 1988.

Caristi, "Carrier–current remote control," Electronics Now, vol. 66, No. 6, p. 49, Jun. 1, 1995.

Carlin, "On the bus," Sound & Image, vol. 4, No. 3, p. 20, Fall 1994.

"What's new in CBus Shop™?" www.cbus–shop.com, at least as early as Jun. 18, 2004.

"U105RHH001BPW1: Handheld Remote Unit—Pearl White," www.cbus–shop.com, at least as early as Jun. 18, 2004.

Coffey, "CEBus," email, at least as early as Jul., 2004.

"Open the pod bay door," Compute!, vol. 14, No. 11, p. 44, Dec. 1992.

Cross et al., "A Fiber Optic Home Automation System," IEEE Transactions on Consumer Electronics, vol. 39, No. 3, pp. 636–645, Aug. 1993.

Davidson, "Echelon's Local Operating Network," Circuit Cellar Ink, pp. 74–77, Jun./Jul. 1991.

Davidson, "Take a Tour of the Bright Home," The Computer Applications Journal, vol. 25, pp. 14–21, Feb./Mar. 1992.

Davidson, "CEBus: A New Standard in Home Automation," Circuit Cellar Ink, pp. 40–52, Aug./Sep., 1989.

Davidson, "CEBus Update," Circuit Cellar Ink, pp. S2–S10, Building Automation Special.

Davidson, "CEBus Gets Physical," Circuit Cellar Ink, pp. 103–104, Feb./Mar., 1991.

Davidson, "CEBus Update: More Physical Details Available," Circuit Cellar Ink, pp. 66–72, Jun./Jul. 1991.

Davidson, "CEBus Goes Coax," The Computer Applications Journal, vol. 25, pp. 108–110, Feb./Mar. 1992.

Davidson, "Habitech 94," The Computer Applications Journal, vol. 47, pp. 46–51, Jun. 1994.

Delaney, "The CEBus perspective," Appliance Manufacturer, vol. 41, No. 5, p. 31, May 1993.

DiChristina et al., "Controlling the Home," Popular Science, vol. 240, No. 5, p. 48, May 1992.

DiLouie, "Automated Controls Can Save Energy," Facilities Design & Management, vol. 41, No. 11, p. 35, Nov. 1995.

Douligeris et al., "The Consumer Electronic Bus Symbol Encoding Sublayer: A Twisted Pair Implementation," IEEE, pp. 385–388, 1992.

Douligeris, "Intelligent Home Systems: Low–cost computers and fiber optics make it possible to implement systems that can integrate data, voice, and visual communications inside the home," IEEE Communications Magazine, pp. 52–61, Oct. 1993.

Douligeris et al., "Communications and Control for a Home Automation System," IEEE, pp. 171–175, 1991.

Driscoll, "A Timeline for Home Automation," www.ed-driscoll.com, 2002.

Edden, "Modelling CEBus homne Automation with Knowledge Based Tools," IEEE, pp. 623–627, 1990.

"LONworks gets interface boards," Electronic Engineering Times, p. 54, Jul. 3, 1995.

Electronic Industries Association. EIA–600 (Sections 600.10, 600.31, 600.32, 600.33, 600.35, 600.37, 600.38, 600.41, 600.42, 600.81, and 600.82), Feb. 1995.

"New CEBus devices target energy management," Electronic News, Vo. 40, No. 2006, p. 48, Mar. 21, 1994.

"Intellon IBM CEBus deal eyes energy/com system," Electronic News, vol. 41, No. 2063, p. 24, May 1, 1995.

"Intellon spins home automation roadmap," Electronic News, vol. 41, No. 2064, p. 46, May 8, 1995.

"WA firm wins US automation award," Electronics Australia, vol. 57, No. 1, p. 123, Jan. 1995.

Evans, "Solving Home Automation Problems Using Artificial Intelligence Techniques," IEEE, pp. 395–400, 1991.

Evans, "CAL: Part of the Solution," Home Automation & Building Control, pp. 59–67, Jul. 1995.

Evans, *The CEBus Standard User's Guide: A Complete Technical Overview*, The Training Department Publications, 1996.

Fisher, "Switch–On CEBus: A CAL Interpreter," The Computer Applications Journal, vol. 31, pp. 24–30, Feb. 1993.

"Home Automation," Futurist, vol. 28, No. 5, p. 7, Sep./Oct. 1994.

GE. Appendix A, GE Authentication and Encryption Algorithm. Version II, Nov. 1995.

Gfeller et al., "Wireless In–House Data Communication via diffuse Infrared Radiation," Processdings of the IEEE< vol. 61, no. 11, pp. 1474–1486, Nov. 1979.

Gikas, "Total Home Control from Your Car," Home Mechanix, vol. 91, No. 794, p. 24, Apr. 1995.

Gilmore, "The integrated automated educated house," Popular Science, vol. 236, No. 6, p. 104, Jun. 1990.

Gilmore, "The World's Smartest Houses," Popular Science, vol. 237, No. 3, p. 56–65, Sep. 1990.

Gilmore et al., "Open (automated) house," Popular Science, vol. 237, No. 4, p. 48, Oct. 1990.

"Home Automation: GSI Home Automation Controller—The Next Generation in Home Automation!" www.global-successine.com, 2003.

Gorzelany, "Hot new electronics," J. Consumers Digest, vol. 28, No. 3, p. 74, May/Jun. 1989.

HomePro, "ZTH100 Radio Frequency Wireless Controller," 2001.

"Z–Wave Information," www.homeseer.com, at least as early as Jun. 21, 2004.

"Z–Wave Lamp Module (HomePro)," www.homeseer.com, at least as early as Jun. 21, 2004.

"Z–Wave Remote Control (ivory)," www.homeseer.com, at least as early as Jun. 21, 2004.

House, "CEBus for the Masses," Home Automation & Building Control, pp. 61–68, Apr. 1995.

Hunt et al., "Are We There Yet?: CEBus Ready to Bring 'Home of the Future' into the Present," Chicago Tribune, p. 22, Mar. 1, 1996.

Interim Standard. IS–60.04 Node Communications Protocol, Part 6: Application Layer Specification. Apr. 1996.

Iversen, "A New Push Begins to Sell a Home Bus," Electronics, vol. 61, No. 12, p. 40, Jun. 1988.

"Building Blocks for Home Automation," IW, p. 23, May 15, 1995.

Jancsurak, "Smart receptacle for smart plugs," Electronic Industries Association, vol. 41, No. 4, p. 62, Apr. 1993.

Karpiniski, "In–home networks draw industry attention," Interactive Age, vol. 2, No. 6, p. 39, Jan. 16, 1995.

Keefe, Jr., "Power Line Modem for Home Control," Electronics Now, p. 65, Mar. 1994.

Khawand et al., "Common Application Language (AL) and Its Integration into a Home Automation System," IEEE, pp. 157–162, 1991.

Kirschner, "Smarts as Last?" Popular Science, vol. 247, No. 1, p. 38, Jul. 1995.

Krause, "Echelon–CEBus rivalry tangles decoder specs," Electronic News, vol. 41, No. 2067, p. 1, May 29, 1995.

Krause, "EIA sees potential CEBus role in U.S. NII Proposal," Electronic News, vol. 40, no. 2021, p. 38, Jul. 4, 1994.

Kung, "Perceived requirements concerning home automation," Trialog, pp. 1–5, Dec. 1995.

Langreth, "Slow going for smart homes," Popular Science, vol. 242, No. 2, p. 60, Feb. 1993.

Leeb, "A User Interface for Home–Net," IEEE, pp. 897–902, 1994.

Markwalter et al., "Design Influences for the CEBus Automation Protocol," IEEE, pp. 145–153, 1991.

McGrath, "Seizing the future," Electric Perspectives, vol. 14, No. 6, p. 14, Nov./Dec. 1990.

McLeister, "Builders in Subdivisions, Scattered Sites Gain Edge with Home Automation," Professional Building, pp. 82–83, Feb. 1995.

McLeister, "Dramatic Changes Lie Ahead for Home Automation," Professional Builder, p. 101, Feb. 1994.

Meth, "Where Will Smart Homes Get Their Smarts?" Electronic Design, vol. 43, No. 19, pp. 61–64, Sep. 18, 1995.

Munro, "Automating the Home," Washington Technology, p. 1, Nov. 9, 1995.

Murray, "Wired and ready," Popular Science, vol. 247, No. 2, p. 36, Aug. 1995.

Nisley, "Two–Way Power Line Communication," The Computer Applications Journal, vol. 25, pp. 74–81, Feb./Mar. 1992.

Pacelle, "Automation is Knocking at U.S. Homes—TVs Can Talk to Thermostats, but Cost Keeps Most Doors from Opening," Asian Wall Street Journal, p. 7, Sep. 29, 1992.

Palenchar, "Z–Wave Takes on Home–Automation Market," www.twice.com, Mar. 22, 2004.

Pargh, "High–tech functions improve new light switches," Chicago Sun–Times, p. 7, Oct. 7, 1990.

Parks, "The State of Home Systems," The Computer Applications Journal, vol. 25, pp. 12–13, Feb./Mar. 1992.

Parks Associates, *Home Systems 94: Home Controls*, Parks Associates, Dallas, 1994.

Parks et al., *X–10 Ltd., Myths and Reality: The Facts Behind th Company and the Technology*, Parks Associates, Dallas, 1994.

Phillips, "Installing a Home Alarm: Protect your property and enjoy extra conveniences with an affordable do–it–yourself system," Home Mechanix, vol. 90, No. 782, p. 60, Feb. 1994.

"Cyberhouse Software Wins Mark of Excellence Award from Home Automation Association," PR Newswire, p. 325, Mar. 25, 1996.

"From start to finish: Molex's Smart House home automation system means quality," Professional Builder, vol. 59, No. 10, p. 18, Oct. 1994.

"Home automation networks links public utility," Professional Builder, vol. 59, No. 7, p. 64, Jul. 1994.

"Home automation & electronics," Professional Builder, vol. 60, No. 2, p. 350, Mid–Jan. 1995.

"Exclusive survey results: Home buyers & the intelligent house," Professional Builder, vol. 60, No. 19, p. 13, Dec. 1995.

Rabbie, title unknown, 1992.

"CEBus Developments," Radio–Electronics, vol. 62, No. 8, p. 4, Aug. 1991.

Remlich, Jr., "Intelligent gas appliances," Appliance Manufacturer, vol. 41, No. 3, p. 63, Mar. 1993.

"RF Locker," at least as early as Jul. 2004.

Rochfort, "Sensory experience," Custom Builder, vol. 9, No. 5, p. S–28, Sep./Oct. 1994.

Ruling, "The Wybron Autopilot," TCI, vol. 29, No. 4, p. 54, Apr. 1995.

Schade, "Convenient Remote–Control Light Switching Saves Energy," Energy & Automation, vol. 9, No. 1, pp. 37–39, Jan./Feb. 1987.

Schade, "Switching of Lighting Installations by Remote Control," Elektrische Energie–Technik, vol. 29, No. 2, p. 18, Jun./Jul. 1984.

Schade, "New Aspects in the Horizontal Power Supply of Lighting Installations," Siemens Power Engineering, vol. 6, No. 4, pp. 239–239, Jul./Aug. 1984.

Schofield, "Home Automation Takes Off: Intellon products support a 'home electronic highway,'" Design News, pp. 84–87, Apr. 10, 1995.

"Introducing Digital Wireless Lighting and Appliance Control," www.smarthomepro.com, at least as early as Jun. 21, 2004.

"Z–Wave Radio Frequency Wireless Controller," www.smarhomeusa.com, at least as early as Jun. 19, 2004.

"Sophisticated Lighting Control for Your Home," www.smarthome.com, at least as early as Jun. 18, 2004.

"Getting Started," www.smarthome.com, at least as early as Jun. 21, 2004.

"A Full–Featured Dimmer for Every Home!" www.smarthome.com, at least as early as Jun. 21, 2004.

"What is X10?" www.smarthome.com, at least as early as Jun. 21, 2004.

"Automatically Turn On X10 Lights When You Enter the Room!" www.smarthome.com, at least as early as Jun. 18, 2004.

"Control Lights and Appliances for the Comfort of Your Sofa!" www.smarthome.com, at least as early as Jun, 21, 2004.

Stauffer, "The Smart House System," The Computer Applications Journal, vol. 31, pp. 14–23, Feb. 1993.

Strassberg, "Home Automation Buses: Protocols really hit home," EDN, pp. 69–80, Apr. 13, 1995.

Taber, "The Arrival of a World Without Wires," Business for Central New Jersey, vol. 2, No. 3, Section 1, p. 3, Feb. 13, 1989.

Tanenbaum, *Computer Networks*, Prentice–Hall, Inc., Englewood Cliffs, New Jersey, pp. 144, 271, 275, 1989.

"Lighting control (Buyers Guide)," TCI, vol. 28, No. 10, p. 56, Dec. 1, 1994.

Teyssier, "BatiBUS: BatiBUS System Design Principles," Jun., 1990.

Uhara et al., "Development of HI (Home Information) Control System," Sharp Technical Journal, vol. 59, pp. 29–42, Aug. 1994.

"Lighting & Appliance Control," www.unitysytemshomemanager.com, at least as early as Jun. 23, 2004.

Wacks, The Impact of Home Automation on Power Electronics, IEEE, pp. 3–9, 1993.

Williams, "Brightening Up The House: Latest Technology, marketing Developments Bring Sophisticated Home Automation Closer to the Masses," Chicago Tribune, p. 1, Mar. 3, 1996.

"Wireless hookups offered through radio technology," UCLA.

"SuperRemote Home Control Kit," www.x10.com, at least as early as Jun. 18, 2004.

Yoshida, "LONWorks connects," Electronic Engineering Times, vol. 769, p. 16, Oct, 25, 1993.

Zhonglei et al., "Simultaneous Control Signal and Power Transmission Through Mechanical Rotary Joint Without Wiring Connection," IEEE, pp. 1589–1593, 1996.

* cited by examiner

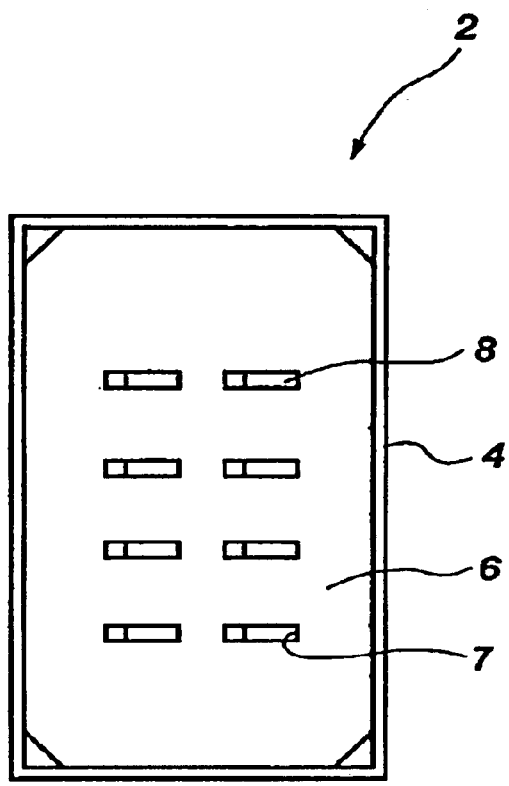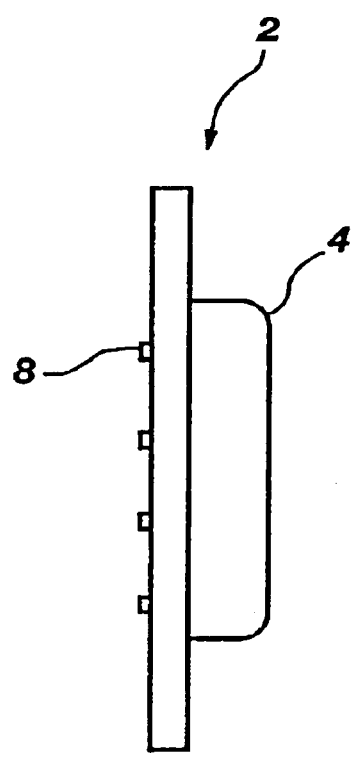
Fig. 1
*(PRIOR ART)*
Fig. 2
*(PRIOR ART)*

SWITCH MATRIX

CROSS-REFERENCE TO RELATED APPLICATIONS

This application is a continuation of 10/024,129, filed Dec. 17, 2001, now U.S. Pat. No. 6,660,948 which claims the benefit of U.S. Provisional Application No. 60/272,020, filed Feb. 28, 2001, which is hereby incorporated by reference herein in its entirety, including but not limited to those portions that specifically appear hereinafter.

BACKGROUND OF THE INVENTION

1. The Field of the Invention

The present invention relates generally to keypad devices, and more particularly, but not necessarily entirely, to a switch matrix which allows the use of variable key positions and key sizes on the keypad.

2. Description of Related Art

It is common practice to provide keypads consisting of one or more keys arranged for entry of data or performing functions such as activating switches. Keypads are used for various types of electronic devices such as user interfaces for home automation and security systems, calculators, telephones, etc. Keypads commonly include an assembly of various parts maintained in a housing.

For example, FIG. 1 shows a keypad, generally indicated at 2, known in the art for use as a primary control point for automation systems used in areas such as homes, businesses, boats, yachts, motor homes and busses. The keypad 2 includes a plurality of keys 8 which can be depressed to control systems such as lighting, security, audio visual and heating/cooling for example. The keys 8 are connected to electronic circuitry which is contained in a housing 4. The keys 8 are fixed in place by an attaching plate 6 so as to be non-removable from the keypad 2. The attaching plate 6 has apertures 7 through which the keys 8 protrude. The apertures 7 are sized and shaped to accommodate keys 8 of a particular size and shape. Therefore, a different attaching plate 6 is required for each size and shape of keys 8 used for the keypad 2. Furthermore, the location of the keys 8 is confined to the locations of the apertures 7. Therefore, a different attaching plate 6 must be used for different configurations of the keys 8. Moreover, if any of the keys 8 become damaged or require replacement, the entire keypad 2 must be replaced or the attaching plate 6 must be removed. Removal of the attaching plate 6 is a difficult task which may require the services of a professional or use of specialized equipment since the attaching plate 6 is fixed to the housing 4 and is not designed to be easily removed without damaging the attaching plate 6 or the housing 4.

The prior art is thus characterized by several disadvantages that are addressed by the present invention. The present invention minimizes, and in some aspects eliminates, the above-mentioned failures, and other problems, by utilizing the methods and structural features described herein.

In view of the foregoing state of the art, it would be an advancement in the art to provide a switch matrix which is capable of being used with keys of different sizes and shapes. It would be a further advancement in the art to provide a switch matrix which allows the keys to be arranged in different configurations using differing numbers of keys. It would also be an advancement in the art to provide a switch matrix which allows the keys to be easily installed and replaced without damaging the matrix.

BRIEF SUMMARY

In view of the above described state of the art, the present invention seeks to realize one or more of the following objects and advantages.

It is a primary object of the present invention to provide a switch matrix which is simple in design and manufacture.

It is another object of the present invention to provide such a switch matrix which is capable of being used with keys of different sizes and shapes.

It is a further object of the present invention, in accordance with one aspect thereof, to provide a switch matrix which allows the keys to be arranged in different configurations using differing numbers of keys.

It is an additional object of the invention, in accordance with one aspect thereof, to provide a switch matrix which allows the keys to be easily installed and replaced without damaging the matrix.

The above objects and others not specifically recited are realized in a specific illustrative embodiment of a switch matrix device. The device preferably includes a support frame including at least one longitudinal member and at least one lateral member substantially perpendicular to the longitudinal member. The switch matrix also preferably includes a grid of key positioning members disposed on the support frame in a series of rows and columns. The key positioning members each preferably include a first cantilever and a second cantilever. The second cantilever preferably includes a pair of arms. An attaching end of the first cantilever is preferably attached to a free end of the second cantilever such that the first cantilever extends parallel to the second cantilever between the pair of arms and towards the fixed end of the second cantilever. The first cantilever also preferably has a key attaching means for removably attaching a key to the key positioning member. The key attaching means preferably includes a knob which is adapted to be fitted into an opening in the keys with a corresponding shape to form a compression fit between the key and the attaching means. This allows the keys to be removably attached to the switch matrix so that keys of differing sizes and shapes may be utilized. The key positioning members are preferably configured to deflect when the key is depressed to activate a switch with a switch activating protrusion which is preferably disposed on the opposite side of the first cantilever from-the key attaching means. The keys can preferably be selectively attached to the key positioning members in various configurations suited for a particular application.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which:

FIG. 1 is a front view of a prior art keypad for an automation system;

FIG. 2 is a side view of the prior art keypad of FIG. 1;

DETAILED DESCRIPTION OF THE PREFERRED EMBODIMENTS

Figure 3:
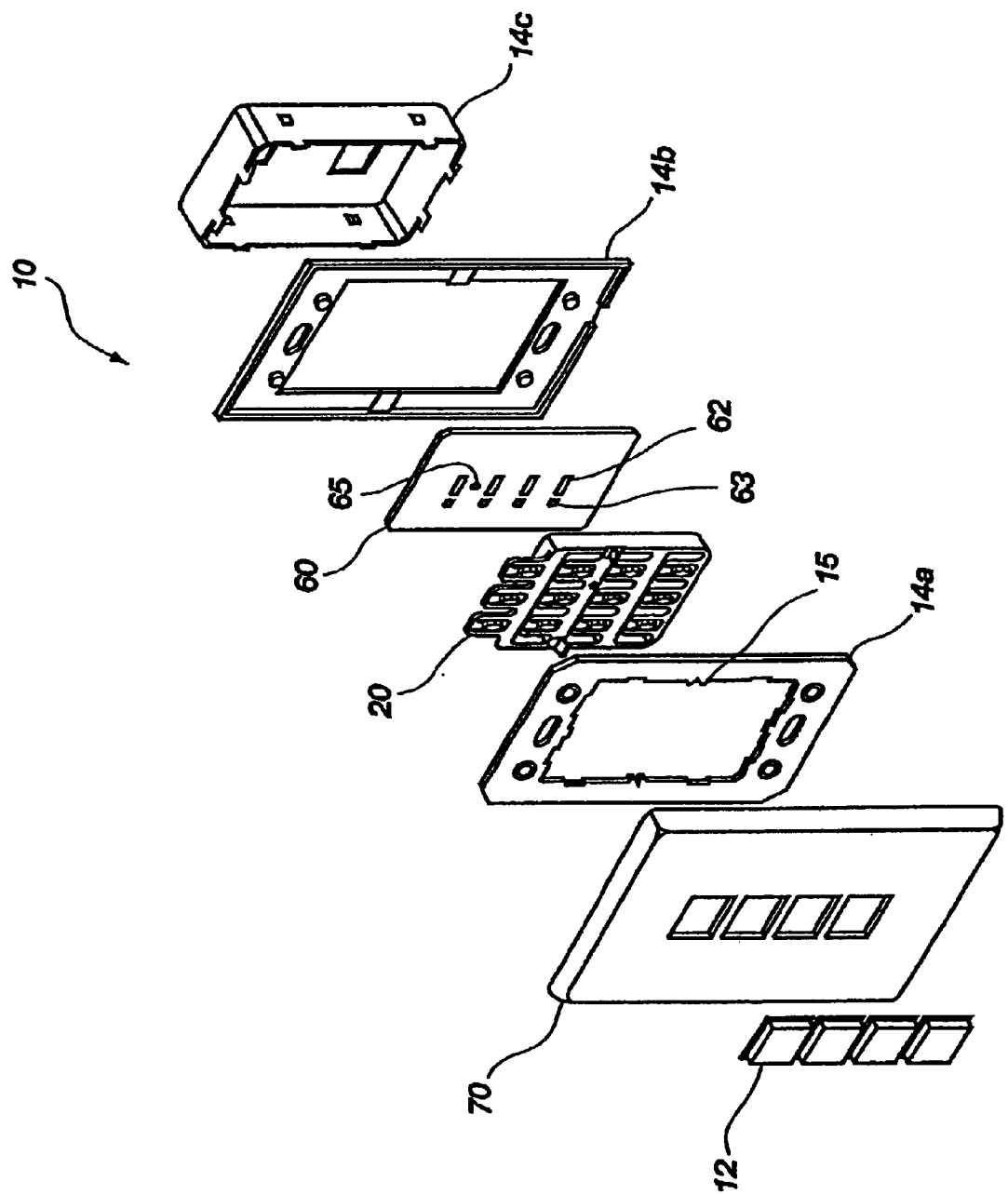
FIG. 3 is an exploded perspective view of a keypad showing a preferred embodiment of the switch matrix of the present invention.

For the purposes of promoting an understanding of the principles in accordance with the invention, reference will now be made to the preferred embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

Referring now to FIG. 3, an exploded perspective view of a keypad, generally indicated at 10, is shown including a preferred embodiment of a switch matrix 20 of the present invention. The keypad 10 may be used as a user interface for home automation and security systems, for example. The keypad 10 preferably includes a plurality of keys 12 which can be depressed to control systems such as lighting, security, audio visual and heating/cooling for example. However, it will be appreciated by those skilled in the art that the keypad 10 may be used in other environments within the scope of the present invention. Other such environments include calculators, telephones, and office equipment, for example.

A housing assembly 14 for the keypad 10 may be configured in various forms. The housing assembly 14 is shown in FIG. 3, as a combination of a front plate 14a, a back plate 14b and a back box 14c, which can be joined together in any suitable manner well known to those skilled in the art. The housing assembly 14 preferably receives electronic control devices such as electronic circuitry board 60 containing switches 62 which can be activated to perform a particular function. Any number of different types of electronic circuitry boards 60 can be utilized within the scope of the present invention and such electronic circuitry boards 60 can readily be arrived at by those skilled in the pertinent art. Switches 62 may be of any variety known in the art which are activated by a mechanical action such as a pressing force. For example, switches 62 may include resilient members which are deflected by a force to close a circuit, and upon release of the force, the resilient members rebound to open the circuit. The electronic circuitry board 60 may be attached to the housing assembly 14 in any suitable manner known in the art such as soldering, adhesives or fasteners, for example. The switch matrix 20 is preferably attached to the housing assembly 14, as described more fully below, such that keys 12 may be attached to the switch matrix 20 to correspond to the location of the switches 62. A face plate 70 preferably covers the switch matrix 20 to improve the appearance of the keypad 10 and to provide further protection of the contents of the housing assembly 14. The face plate 70 may be attached to the housing assembly 14 in any manner known in the art such as magnets or fasteners, for example.

Figure 4:
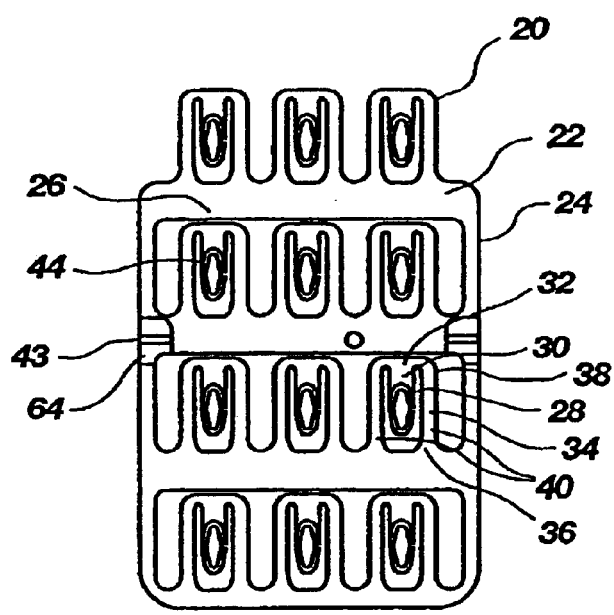
FIG. 4 is a plan view of a preferred embodiment of the switch matrix of the present invention.

Referring now to FIG. 4, a plan view of a preferred embodiment of the switch matrix 20 is shown. The switch matrix 20 preferably includes a support frame 22. The support frame 22 preferably includes at least one longitudinal member 24 and at least one lateral member 26 which, in the illustrated embodiment, are substantially perpendicular to each other. More preferably, the support frame 22 includes two longitudinal members 24 and a plurality of lateral members 26 arranged to support a grid of key positioning members 28.

Figure 11:
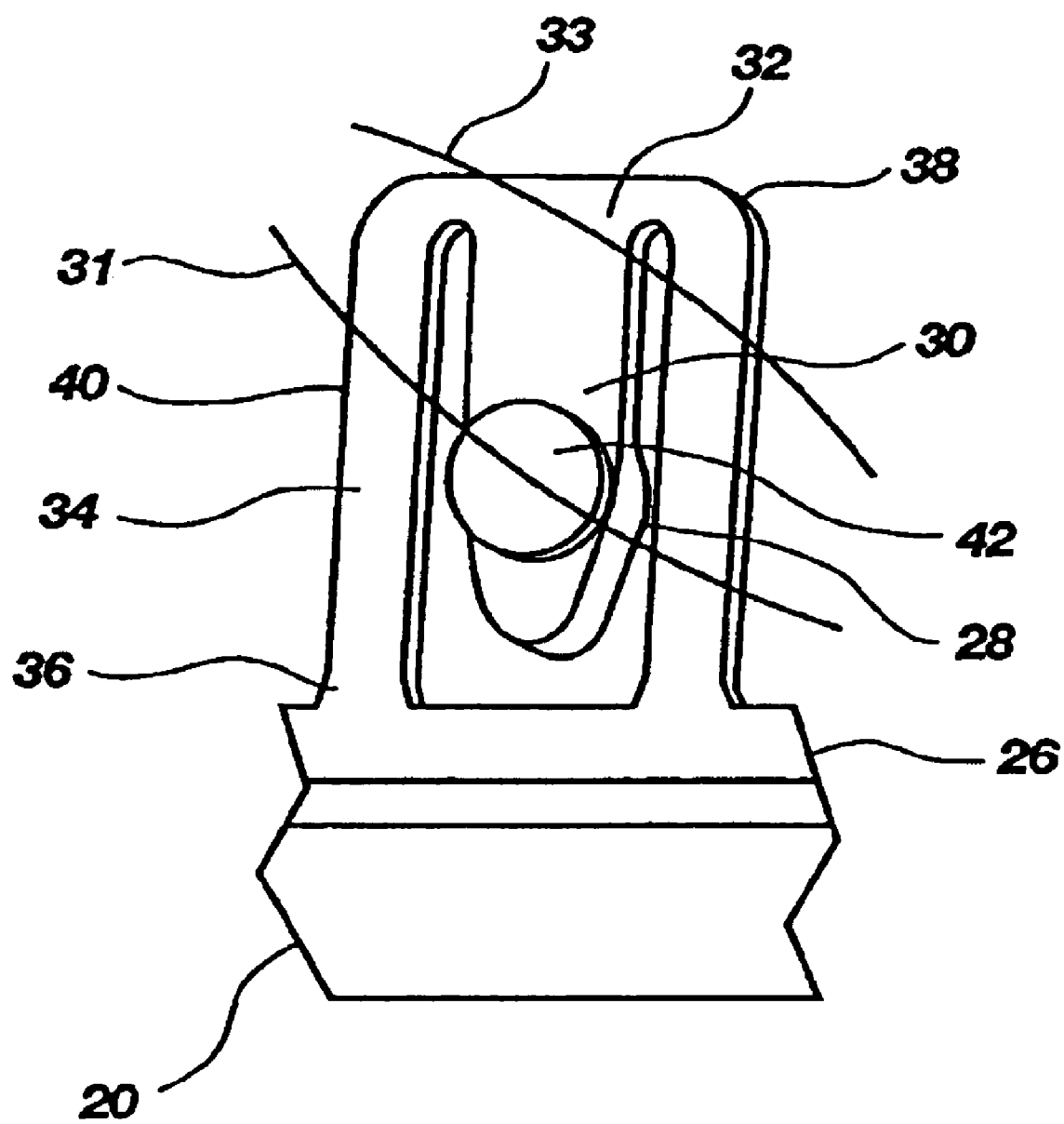
FIG. 11 is a break-away perspective bottom view of a cantilever system of the switch matrix of FIGS. 3–6.

The key positioning members 28 preferably include a first cantilever 30 having an attached end 32, shown most clearly in FIG. 11. The attached end 32 of the first cantilever 30 is preferably attached to a free end 38 of a second cantilever 34. The second cantilever 34 is preferably disposed on the support frame 22 at a fixed end 36 and includes a pair of spaced apart arms 40 such that the first cantilever 30 may reside between the arms 40 and parallel to the arms 40. The configuration of the first cantilever 30 and the second cantilever 34 allows for improved deflection and force transfer capabilities in that the key positioning member 28 allows for deflection in a substantially linear direction. For example, the first cantilever 30 preferably deflects in a curved path 31 with respect to the attached end 32. Whereas the second cantilever 34 deflects in a oppositely curved path 33 with respect to the fixed end 36 of the second cantilever 34. The opposite curvature of curved path 31 of the first cantilever 30 and the curved path 33 of the second cantilever 34, tend to reduce the amount of curvature in travel path of the key positioning member 28 such that deflection of the key positioning member 28 takes place in a substantially linear direction.

Figure 6:
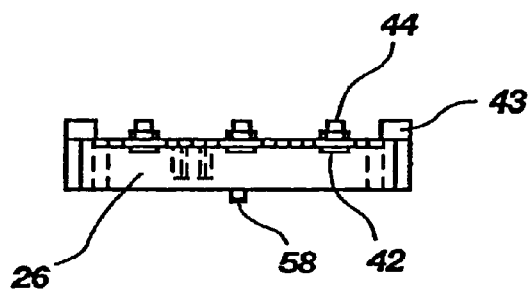
FIG. 6 is an end view of the switch matrix of FIG. 4.
Figure 7:
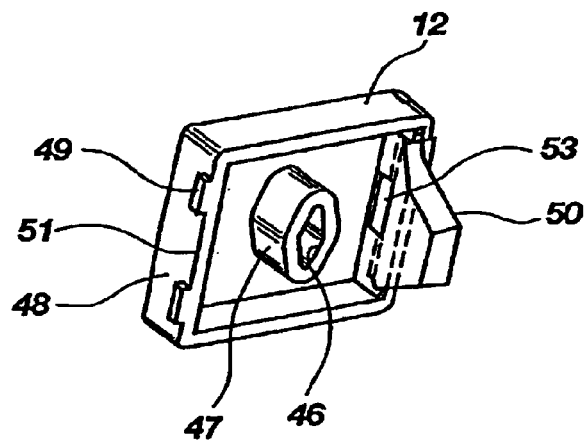
FIG. 7 is a bottom perspective view of an exemplary embodiment of a key used in conjunction with the switch matrix of the present invention.

A switch activating protrusion 42, shown in FIGS. 6 and 11, is preferably disposed on a bottom side of the first cantilever 30. The switch activating protrusion 42 is configured to contact the switch 62 (see FIG. 3) as the first cantilever 30 is depressed. The upper side of the first cantilever 30 preferably includes a knob 44 which may be inserted into an opening 46 defined by a sidewall 47 of the key 12, as shown in FIG. 7. The knob 44 and opening 46 are preferably sized to create a compression or friction fit between the key 12 and the knob 44 such that the key 12 is held tightly in place. However, the key 12 is not permanently fixed to the knob 44 such that the key 12 may be removed from the knob 44 if desired. The knob 44 is one preferred example of a key attaching means. Other means for removably attaching a key 12 to the switch matrix 20 may be used within the scope of the present invention. For example, the knob 44 may be located on the key 12 and the opening 46 may be located on the switch matrix 20.

It will be appreciated that the structure and apparatus disclosed herein is merely one example of a key attaching means for removably attaching a key to the switch matrix, and it should be appreciated that any structure, apparatus or system for removably attaching a key to the switch matrix which performs functions the same as, or equivalent to, those disclosed herein are intended to fall within the scope of a means for removably attaching a key to the switch matrix, including those structures, apparatus or systems for removably attaching a key to the switch matrix which are presently known, or which may become available in the future. Any structure which functions the same as, or equivalently to, the herein described means for removably attaching a key to the switch matrix falls within the scope of this element as set forth in the claims.

The knob 44 (FIG. 6) may have a diamond shape, for example, which corresponds to the opening 46 also having a diamond shaped and provided in the key 12. As those skilled in the art will appreciate, knobs 44 and openings 46 of other shapes, and other structures to removably attach the key 12 to the switch matrix 20, may be used within the scope of the present invention. Furthermore, the size and shape of the key 12 is not dependant upon the means for removably attaching the key 12 to the switch matrix 20. In the prior art system shown in FIG. 1, the apertures 7 of the attaching plate have a size and shape configured for specific keys, whereas the switch matrix 20 of the present invention advantageously allows keys 12 of various sizes and shapes to be attached. Those skilled in the art will appreciate that advantages which the present invention provides by allowing different number of keys and different sizes and shapes of keys to be utilized.

Figure 5:
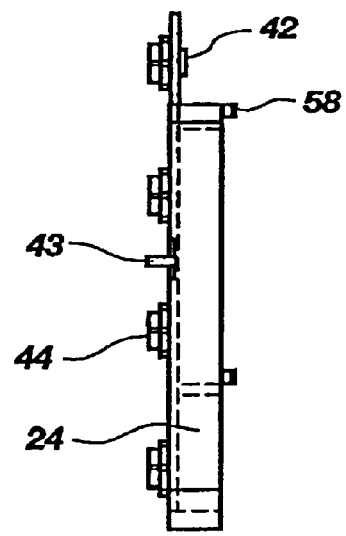
FIG. 5 is a side view of the switch matrix of FIG. 4.

The switch matrix 20 may also include abutments 43 on opposing sides of the support frame 22, as shown most clearly in FIGS. 4–6. The abutments 43 may project from the switch matrix 20 to contact the face plate 70 to prevent the face plate 70 from flexing into the knobs 44. The abutments 43 may therefore prevent activation of the switches 62 due to forces applied to the face plate 70.

Figure 8:
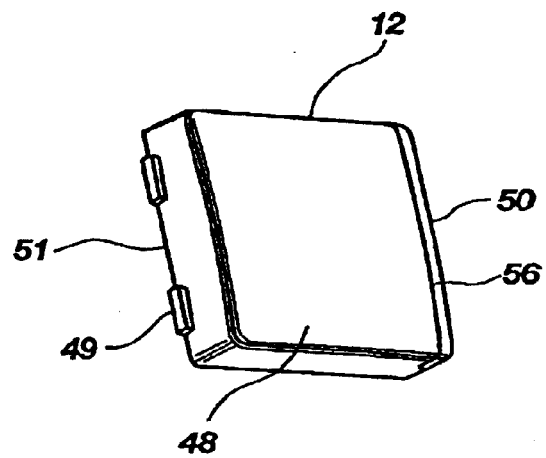
FIG. 8 is a top perspective view of the exemplary embodiment of the key of FIG. 7.

FIGS. 7 and 8 show an exemplary embodiment of the key 12. Many different variations of key 12 may be formed utilizing various sizes and shapes in addition to those shown in the figures. For example, the keys 12 may be round, triangular, oval, polygonal, or in the shape of objects such as arrows, waves or light bulbs or any other shape. Preferably, keys 12 include a key body 48 and a light pipe 50. The key body 48 provides a surface area which can be depressed by a human user to activate the switch 62 (see FIG. 3). The key body 48 may also be engraved or labeled to provide an indication of the function of the key 12. The key 12 may further include one or more stops 49 to prevent the key 12 from passing through the face plate 70. The stops 49 may be segmented or continuous around a bottom edge 51 of the key 12.

The light pipe 50 is preferably made of a translucent material which directs light from a light source 63 (see FIG. 3) located below the key 12 to the upper surface 56 of the key 12. Thus the light pipe 50 allows the transmission of light from the electronic circuitry board 60 to the upper surface 56 of the key 12 to provide visual signals to the user. The light pipe 50 is preferably attached to the key body 48 without the use of adhesive or tools. For example, the light pipe 50 may have a projection (not shown) which may be inserted into a cavity (not shown) in the key body 48 such that the light pipe 50 is held to the key body 48 through friction. The key body 48 may be configured with cut-out portions, such as depicted at 53 in FIG. 7, to reduce the amount of material required to manufacture the key body 48 where possible.

The light source 63 is preferably located on the electronic circuitry board 60 in close proximity to the switches 62 as shown in FIG. 3. The light source 63 may include one or more light emitting diodes, for example. The light source 63 may utilize a single or multiple colors, and may be programmed to blink, change colors, or vary in illumination intensity to indicate the status of the keypad 10. It will be appreciated that other devices for generating light may be used within the scope of the present invention.

The switch matrix 20 also preferably includes aligning posts 58, as shown in FIGS. 5 and 6, which extend from an undersurface of the switch matrix 20 to register with recesses 65 on the electronic circuitry board 60 (FIG. 3). The aligning posts 58 align the switch matrix 20 so that the switch activating protrusions 42 register properly with the switches 62. It will be appreciated that other structures may be used within the scope of the present invention to align the switch matrix 20 with the electronic circuitry board 60.

The switch matrix 20 also preferably includes grooves 64 disposed in the support frame 22. The grooves 64 are preferably configured to receive tabs 15 (see FIG. 3) located on the housing assembly 14 to hold the switch matrix 20 in place with respect to the housing assembly 14. It will be appreciated by those skilled in the art that other structures besides the grooves 64 and the tabs 15 may be used within the scope of the present invention to hold the switch matrix 20 in place with respect to the housing assembly 14.

The switch matrix 20 is preferably formed as a single piece from molded plastic. However, as those skilled in the art will appreciate, other materials may be used to form the switch matrix 20 within the scope of the present invention.

Figure 9:
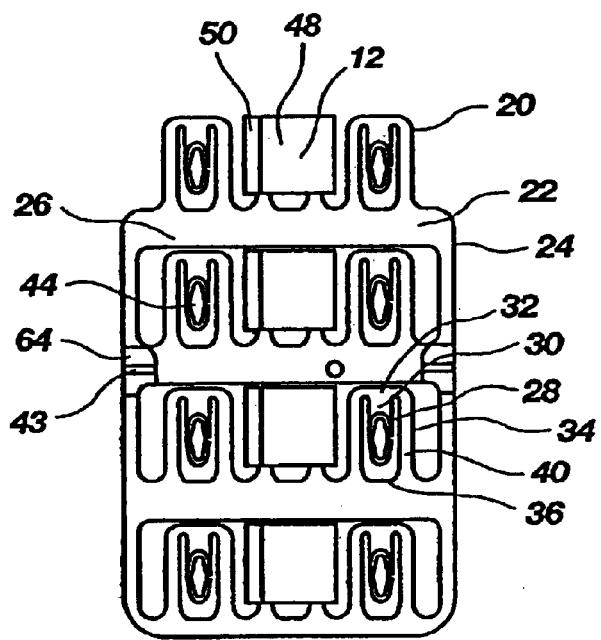
FIG. 9 is a plan view of an exemplary embodiment of one of many key configurations made possible by the switch matrix of the present invention.

In use, keys 12 are attached to any or all of the key positioning members 28 to correspond with the position of the switches 62 on the electronic circuitry board 60. An exemplary configuration of the keys 12 on the switch matrix 20 is shown in FIG. 9. It will be appreciated that numerous different configurations of keys 12 are possible in addition to that shown in FIG. 9. A key 12 may be so large as to cover multiple key positioning members 28, or small enough such that a key 12 may be attached to all key positioning members 28. Furthermore, the switch matrix 20 may be constructed to contain any different number of key positioning members 28 such that the number of possible key configurations is very large. The keys 12 may be attached to the switch matrix 20 in a desired configuration without the need for making modifications to the switch matrix 20. Therefore, the switch matrix 20 can be more easily installed at a location in the field where the switch matrix 20 is being installed since the need for specialized tools or equipment, as required by the prior art, is eliminated. Furthermore, the switch matrix 20 is adapted for numerous different key configurations so a single switch matrix 20 can be used in the place of multiple attaching plates 6 as required by the prior art for different key configurations.

If the need arises to repair or replace a key 12, the key 12 may simply be detached from the switch matrix 20 by pulling on the key 12 with sufficient force to overcome the compression fit between the knob 44 and the opening 46. This can be done without removing the switch matrix 20 from the housing assembly 14, and without damaging the switch matrix 20. The ease with which the keys 12 may be replaced allows users to maintain and repair the keys 12 without the need for purchasing a new keypad 10, obtaining specialized tools or hiring a technician to perform the work.

Figure 10:
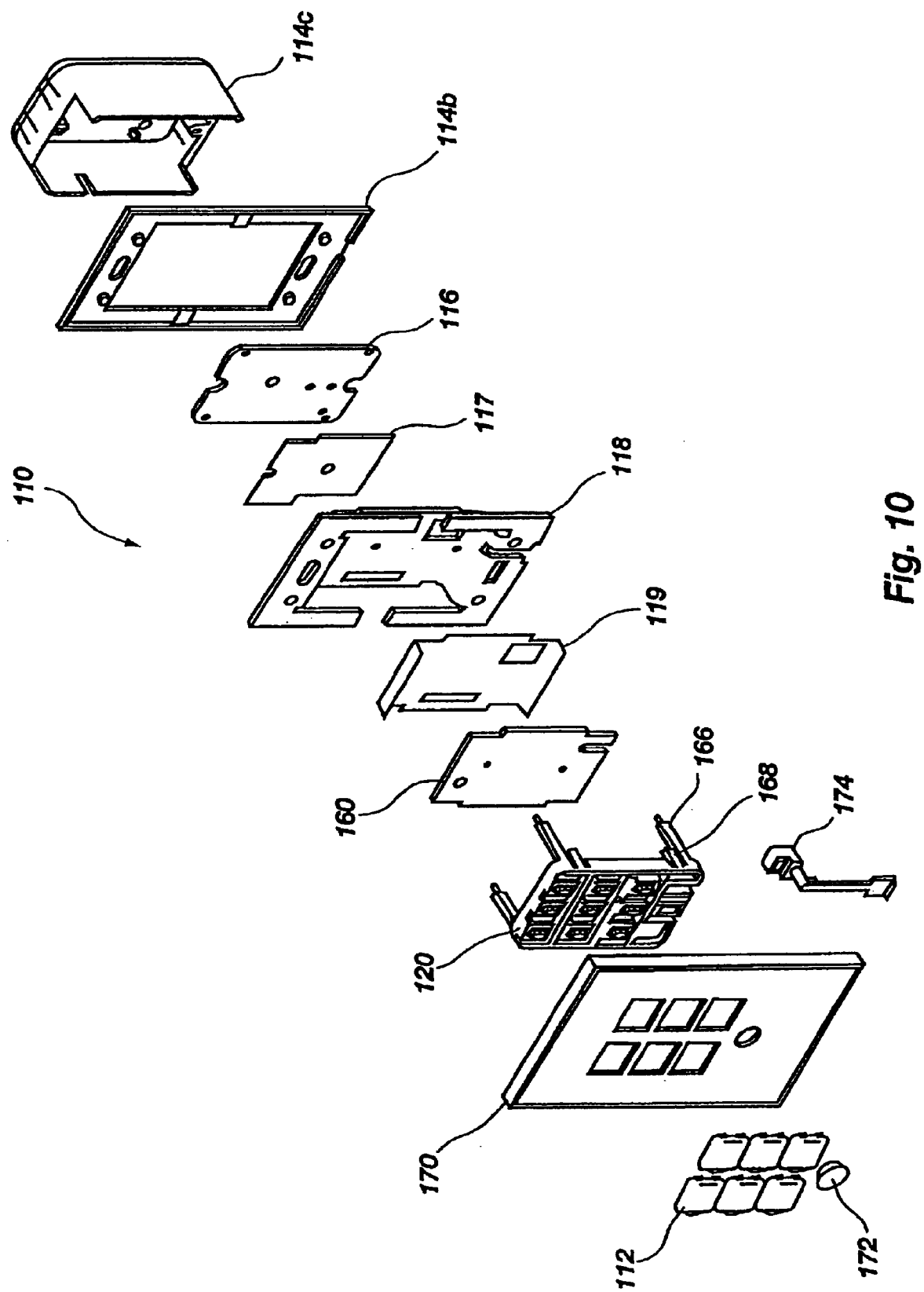
FIG. 10 is an exploded perspective view of an alternative embodiment of the switch matrix in a different keypad environment.

Reference will now to made to FIG. 10 to describe a second presently preferred embodiment of the present invention. As previously discussed, the presently preferred embodiments of the invention illustrated herein are merely exemplary of the possible embodiments of the invention, including that illustrated in FIG. 10.

It will be appreciated that the second embodiment of the invention illustrated in FIG. 10 contains many of the same structures represented in FIGS. 1–9 and only the new or different structures will be explained to most succinctly explain the additional advantages which come with the embodiment of the invention illustrated in FIG. 10. The second embodiment of the inventive switch matrix 120 is shown in a different keypad environment 110. The second embodiment of the switch matrix 120 preferably includes legs 166 to support and align the switch matrix 120 within the keypad 110. The switch matrix 120 also preferably includes clips 168 to attach the switch matrix 120 to other components of the keypad 110. Other components of the keypad 110 may include a back box 114c, a back plate 114b, an additional printed circuit board 116, a first insulator 117, a bracket 118 and a second insulator 119. The keypad 110 may also include an optional input unit 172. The optional input unit 172 may include a built in infrared receiver which may allow a user to transmit commands to the keypad 110 from a remote location. The keypad 110 may also have a service switch lever 174 for performing functions such as cutting the flow of electricity in the keypad 110. It will be appreciated that numerous other configurations of components of the keypad 110 may be used within the scope of the present invention. The components of the keypad 110 illustrated in FIG. 10 are merely exemplary of the numerous environments in which the switch matrix 120 may be utilized.

In view of the foregoing, it will be appreciated that the present invention provides a switch matrix which is capable of being used with keys of different sizes and shapes. The present invention also provides a switch matrix which allows the keys to be arranged in different configurations using differing numbers of keys. The present invention further provides a switch matrix which allows the keys to be easily installed and replaced without damaging the matrix.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention have been shown in the drawings and fully described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A switch matrix for use in a keypad, said switch matrix comprising:
   a support frame; and
   at least one key positioning member disposed on said support frame, said at least one key positioning member comprising a first cantilever and key attaching means for removably attaching a key to said key positioning member;
   wherein keys of different sizes and shapes may be attached to said switch matrix.

2. The switch matrix of claim 1 further comprising a switch activating protrusion disposed on said first cantilever.

3. The switch matrix of claim 2 wherein said switch activating protrusion is disposed on an opposite side of said first cantilever from said key attaching means.

4. The switch matrix of claim 1 further comprising a second cantilever having a fixed end and a free end, said second cantilever being connected to the support frame.

5. The switch matrix of claim 4 wherein said first cantilever is disposed on said free end of said second cantilever.

6. The switch matrix of claim 5 wherein a free end of said first cantilever extends in a direction toward said fixed end of said second cantilever.

7. The switch matrix of claim 4 wherein said first cantilever extends parallel to said second cantilever.

8. The switch matrix of claim 4 wherein said second cantilever comprises a pair of arms, and wherein said first cantilever resides between the pair of arms of the second cantilever.

9. The switch matrix of claim 1 wherein said support frame comprises at least one longitudinal member and at least one lateral member substantially perpendicular to said longitudinal member.

10. The switch matrix of claim 9 wherein said support frame comprises two longitudinal members and four lateral members.

11. The switch matrix of claim 1 wherein said support frame comprises at least one groove for attaching said switch matrix to said keypad.

12. The switch matrix of claim 1 wherein said at least one key positioning member comprises a plurality of key positioning members disposed in a series of rows and columns.

13. The switch matrix of claim 12 wherein said series of rows and columns comprises four rows and three columns to include twelve key positioning members.

14. The switch matrix of claim 1 wherein said key attaching member comprises a knob.

15. The switch matrix of claim 14 wherein said knob is substantially diamond shaped.

16. The switch matrix of claim 1 further comprising at least one stud disposed thereon for aligning the switch matrix so that the keys register with switches.

17. The switch matrix of claim 1 further comprising at least one leg for supporting said switch matrix in said keypad.

18. The switch matrix of claim 1 further comprising at least one resilient clip for attaching said switch matrix to other components within said keypad.

19. A switch matrix for use in a keypad, said switch matrix comprising:
   a plurality of key positioning members, each of the key positioning members comprising a first cantilever having an attached end, and a second cantilever having a fixed end and a free end, said attached end of said first cantilever disposed on said free end of said second cantilever;
   wherein said each of said key positioning members are configured to receive a key.

20. The switch matrix of claim 19 further comprising a switch activating protrusion disposed on said first cantilever.

21. The switch matrix of claim 19 further comprising key attaching means for removably attaching said key to said plurality of key positioning members.

22. The switch matrix of claim 21 wherein said key attaching means comprises a knob.

23. The switch matrix of claim 22 wherein said knob is substantially diamond shaped.

24. The switch matrix of claim 19 wherein a free end of said first cantilever extends in a direction toward said fixed end of said second cantilever.

25. The switch matrix of claim 19 wherein said first cantilever extends parallel to said second cantilever.

26. The switch matrix of claim 19 wherein said second cantilever comprises a pair of arms, and said first cantilever resides between said pair of arms of said second cantilever.

27. The switch matrix of claim 19 further comprising a support frame for supporting said plurality of key positioning members.

28. The switch matrix of claim 27 wherein said support frame comprises at least one groove for attaching said switch matrix to said keypad.

29. The switch matrix of claim 27 wherein said support frame comprises at least one longitudinal member and at least one lateral member substantially perpendicular to said longitudinal member.

30. The switch matrix of claim 29 wherein said support frame comprises two longitudinal members and four lateral members.

31. The switch matrix of claim 19 wherein said plurality of key positioning members are disposed in a series of rows and columns.

32. The switch matrix of claim 19 further comprising at least one stud disposed thereon for aligning the switch matrix so that the keys register with switches.

33. The switch matrix of claim 19 further comprising at least one leg for supporting said switch matrix in said keypad.

34. The switch matrix of claim 19 further comprising at least one resilient clip for attaching said switch matrix to other components within said keypad.

35. A switch matrix for use in a keypad, said switch matrix comprising:
    a plurality of key positioning members, each of said plurality of key positioning members comprising a knob; and
    at least one key having an opening defined by a sidewall, said opening configured to receive said knob to removably attach said at least one key to said knob with a friction fit;
    wherein said at least one key may be attached to any of said plurality of key positioning members such that a configuration of said at least one key on said keypad may be varied.

36. The switch matrix of claim 35 wherein said at least one key further comprises a light pipe to direct light from a lower surface of said at least one key to an upper surface of said at least one key.

37. The switch matrix of claim 36 wherein said light pipe is attached to said key by interfitting parts such that no adhesive or fasteners are required.

38. The switch matrix of claim 35 wherein said plurality of key positioning members each comprise a first cantilever deflectable to contact a switch.

39. The switch matrix of claim 38 wherein said first cantilever comprises an attached end, said attached end of said first cantilever being attached to a second cantilever.

40. The switch matrix of claim 39 wherein said second cantilever comprises a pair of arms, and said first cantilever resides between said pair of arms of said second cantilever.

41. The switch matrix of claim 35 further comprising a support frame for supporting said plurality of key positioning members.

42. The switch matrix of claim 41 wherein said support frame comprises at least one longitudinal member and at least one lateral member substantially perpendicular to said longitudinal member.

43. The switch matrix of claim 41 wherein said support frame comprises at least one groove for receiving a tab to attach said switch matrix to said keypad.

44. The switch matrix of claim 35 wherein said plurality of key positioning members are disposed in a series of rows and columns.

45. The switch matrix of claim 35 wherein said knob is substantially diamond shaped.

46. A method of attaching one or more keys to a keypad comprising the steps of:
    (a) providing a switch matrix having a plurality locations where said one or more keys may be attached;
    (b) attaching said switch matrix to said keypad;
    (c) providing said one or more keys of a first size and shape;
    (d) selecting one or more of said plurality of locations on said switch matrix to attach said one or more keys; and
    (e) pressing said one or more keys on said one or more of said selected plurality of locations to attach said one or more keys to said keypad.

47. The method of claim 46 further comprising covering said switch matrix with a face plate.

48. The method of claim 46 wherein step (e) further comprises joining a knob on said one or more of said selected plurality of locations with an opening on said one or more keys to fasten said one or more keys to said keypad with a friction fit.

49. The method of claim 46 further comprising removing said one or more keys from said keypad by pulling on said one or more keys.

50. The method of claim 49 further comprising providing one or more keys of a second size and shape different from said first size and shape, and pressing said one or more keys of said second size and shape on said one or more of said selected plurality of locations to attach said one or more keys of said second size and shape to said keypad.

51. The method of claim 49 further comprising selecting another one or more of said plurality of locations and pressing said one or more keys on said another one or more of said plurality of locations to attach said one or more keys to said keypad.

52. A method for attaching keys of different sizes and shapes to a keypad, said method comprising:
    (a) providing a plurality of attaching means for removably attaching said keys;
    (b) providing said keys having corresponding attaching means independent of the size and shape of said keys;
    (c) selecting a configuration of said keys to be attached on said keypad;
    (d) selecting said attaching means corresponding to the configuration of said keys to be attached on said keypad; and
    (e) joining said corresponding attaching means to said selected attaching means to thereby attach said keys to said keypad.

53. A switch matrix for use in a keypad, said switch matrix comprising:
    a grid of key attaching means for removably attaching keys to said switch matrix;
    wherein said keys may be selectively attached to said key attaching means to form different key configurations.

* * * * *